(12) United States Patent
Huh

(10) Patent No.: US 8,724,716 B2
(45) Date of Patent: May 13, 2014

(54) METHOD AND APPARATUS FOR INVERSE FAST FOURIER TRANSFORM (IFFT) IN COMMUNICATION SYSTEM

(75) Inventor: Heon Huh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 781 days.

(21) Appl. No.: 12/327,796

(22) Filed: Dec. 3, 2008

(65) Prior Publication Data
US 2009/0147874 A1 Jun. 11, 2009

(30) Foreign Application Priority Data
Dec. 6, 2007 (KR) .................. 10-2007-0126109

(51) Int. Cl.
*H04K 1/10* (2006.01)
(52) U.S. Cl.
USPC ........... 375/260; 375/259; 375/296; 375/219; 375/316; 375/267; 370/203; 370/210; 370/348; 370/344; 455/296

(58) Field of Classification Search
USPC ................. 375/260, 259, 296, 219, 316, 267; 370/203, 210, 348, 344; 455/296
See application file for complete search history.

(56) References Cited

U.S. PATENT DOCUMENTS

| | | | |
|---|---|---|---|
| 7,136,423 B1 * | 11/2006 | Duvaut et al. | 375/260 |
| 2002/0006167 A1 * | 1/2002 | McFarland | 375/260 |
| 2004/0059766 A1 * | 3/2004 | Yeh | 708/406 |
| 2006/0062317 A1 * | 3/2006 | Chang et al. | 375/260 |
| 2007/0201354 A1 | 8/2007 | Oh et al. | |
| 2007/0239815 A1 * | 10/2007 | Cousineau et al. | 708/404 |

FOREIGN PATENT DOCUMENTS

KR 10-2006-0021479 A 3/2006

* cited by examiner

*Primary Examiner* — Zewdu Kassa
(74) *Attorney, Agent, or Firm* — Jefferson IP Law, LLP (57) ABSTRACT

A method and an apparatus for Inverse Fast Fourier Transform (IFFT) in a communication system are provided. The method includes determining an IFFT size based on a number of input information symbols, and performing an IFFT operation based on the determined IFFT size.

11 Claims, 7 Drawing Sheets

METHOD AND APPARATUS FOR INVERSE FAST FOURIER TRANSFORM (IFFT) IN COMMUNICATION SYSTEM

PRIORITY

This application claims the benefit under 35 U.S.C. §119 (a) of a Korean patent application filed in the Korean Intellectual Property Office on Dec. 6, 2007 and assigned Serial No. 10-2007-0126109, the entire disclosure of which is hereby incorporated by reference.

BACKGROUND OF THE INVENTION

1. Field of the Invention

The present invention relates to a method and an apparatus for Inverse Fast Fourier Transform (IFFT) in a communication system. More particularly, the present invention relates to a method and an apparatus for adaptively changing an IFFT size according to a size of information to transmit at a transmitter in an Orthogonal Frequency Division Multiplexing (OFDM) or a Single Carrier Frequency Division Multiple Access (SC-FDMA) communication system.

2. Description of the Related Art

In response to increasing demands for not only voice communications but also data services, such as various multimedia Internet services in a wireless communication market, an Orthogonal Frequency Division Multiplexing (OFDM) scheme and a Single Carrier Frequency Division Multiple Access (SC-FDMA) scheme are attracting attention as wireless transmission techniques to meet those demands. The OFDM scheme is adopted by Institute of Electrical and Electronics Engineers (IEEE) 802.16e WiBro or mobile WiBro standards, wireless Local Area Network (LAN), and 3rd Generation Partnership Project (3GPP) Long Term Evolution (LTE). The SC-FDMA scheme is used to raise a power efficiency of a terminal by lowering a Peak-to-Average Power Ratio (PAPR) which is a shortcoming of the OFDM scheme, and is currently adopted as an uplink scheme in the 3GPP LTE.

Figure 1:
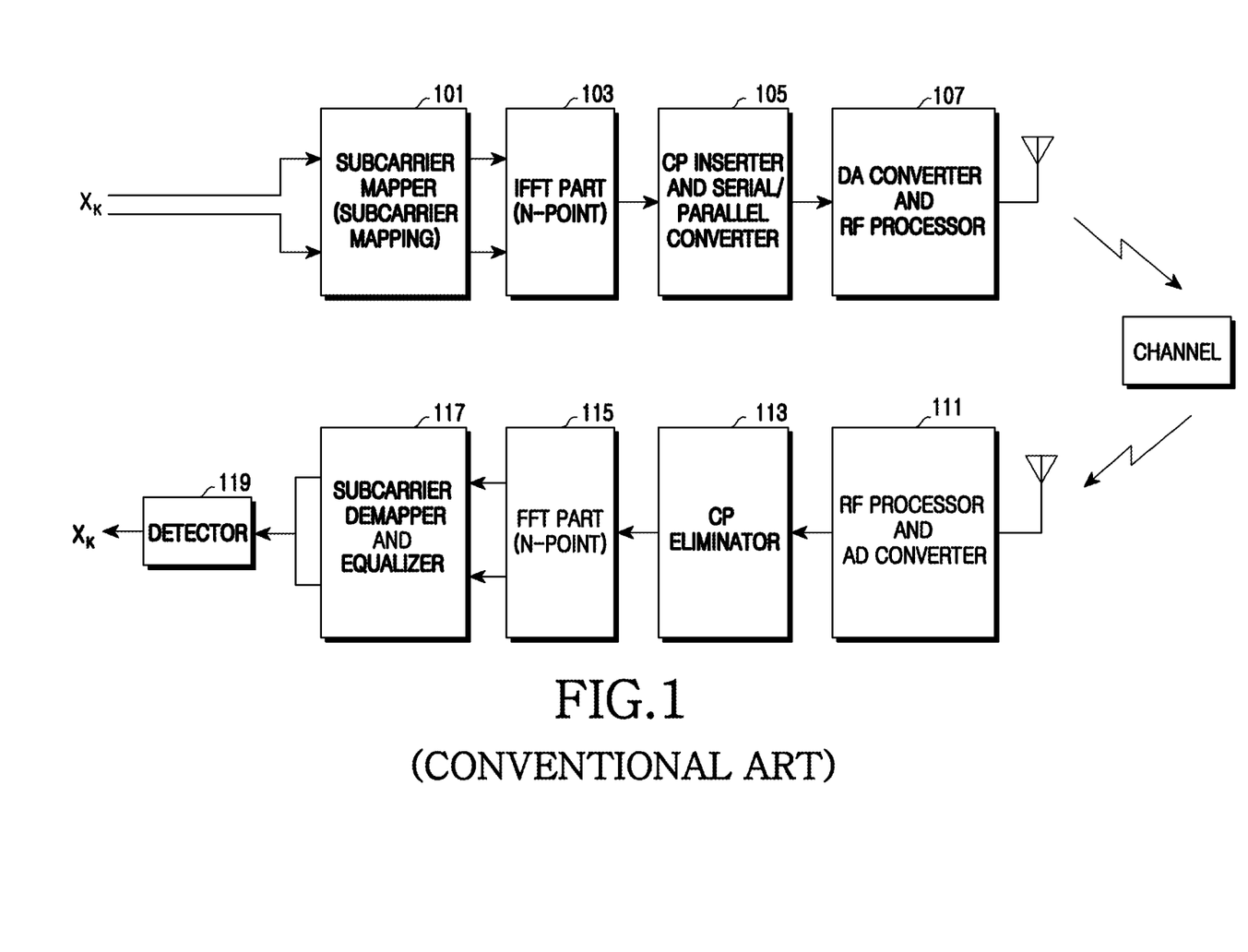
FIG. 1 is a block diagram of a conventional transmitter and receiver in an OFDMA system.

The OFDM scheme raises a data rate by converting an input serial data stream into N-ary parallel data streams and transmitting the data on separate subcarriers. FIG. 1 is a block diagram of a conventional transmitter and receiver in the OFDMA system. Referring to FIG. 1, a transmitter of the OFDM system allocates a transmit symbol $X_K$ to transmit into an intended frequency band through a subcarrier mapping 101, performs an N-point Inverse Fast Fourier Transform (IFFT) 103, inserts a Cyclic Prefix (CP) into the IFFT-processed transmit symbol and converts the IFFT-processed transmit symbol into serial data 105, applies digital/analog conversion and Radio Frequency (RF) processing 107 to the data, and then transmits the signal via a channel to a receiver. Referring to FIG. 1, the receiver of the OFDM system receives the signal from the transmitter, applies RF processing and analog/digital conversion 111 to the received signal, eliminates the CP 113, performs N-point FFT 115, performs subcarrier demapping and equalization 117, and detects and restores the transmit symbol 119.

Figure 2:
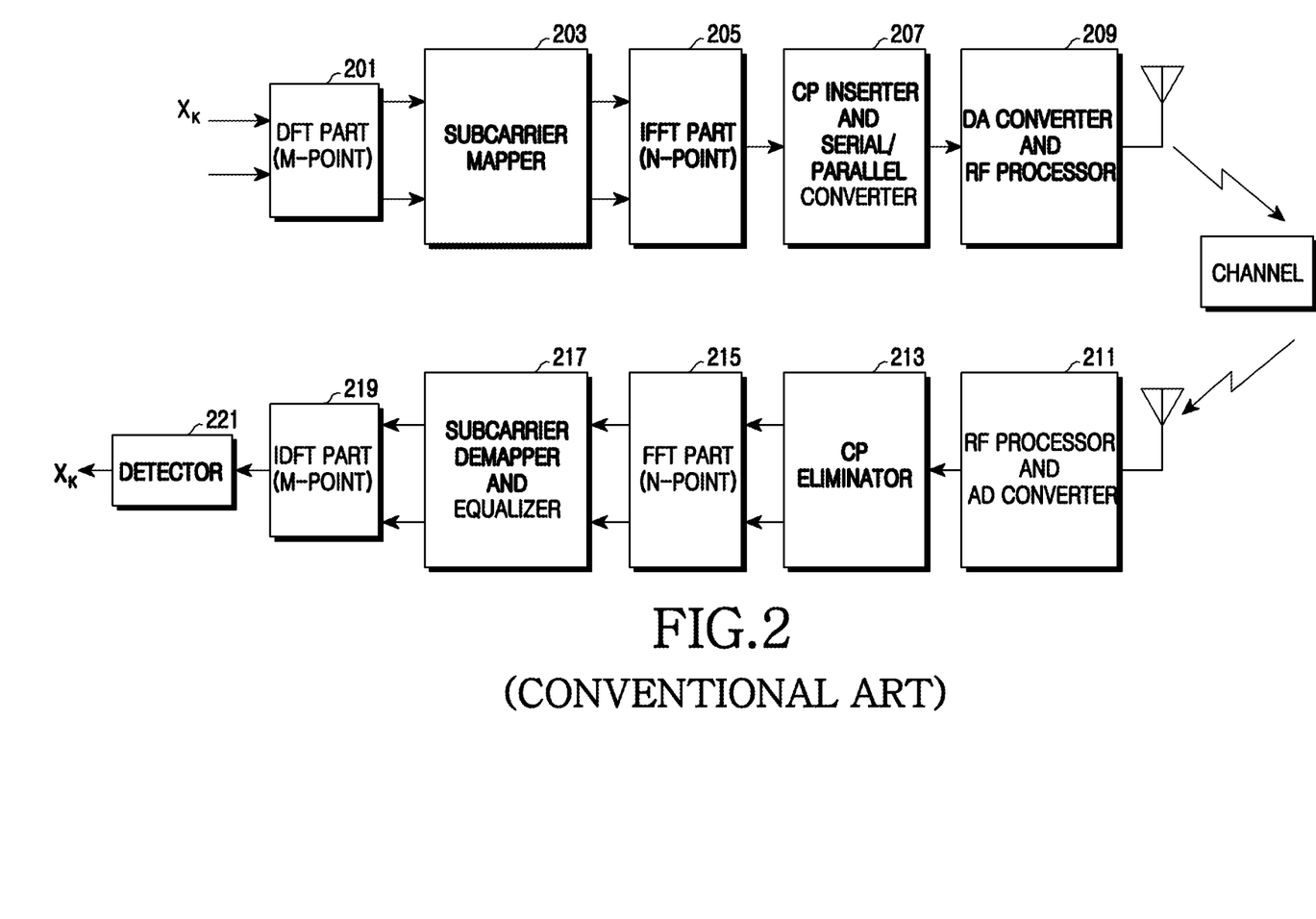
FIG. 2 is a block diagram of a conventional transmitter and receiver in an SC-FDMA system.

In contrast, unlike the OFDM, a signal to transmit is defined in the time domain according to the SC-FDMA. FIG. 2 is a block diagram of a conventional transmitter and receiver in the SC-FDMA system. Referring to FIG. 2, a transmitter of the SC-FDMA system converts the time-domain transmit symbols $X_K$ into a signal of the frequency domain through an M-point Discrete Fourier Transform (DFT) 201, allocates the transmit symbols to an intended frequency band through a subcarrier mapping 203, and performs an N-point IFFT 205. Next, the SC-FDMA transmitter adds a CP to the IFFT-processed transmit symbol and converts the IFFT-processed transmit symbol into serial data 207, applies the digital/analog conversion and the RF processing 209, and transmits the signal via a channel to the receiver, as in the OFDM. Referring to FIG. 2, the receiver of the SC-FDMA system receives the signal from the transmitter, applies RF processing and analog/digital conversion 211 to the received signal, eliminates the CP 213, performs the N-point FFT 215, performs the subcarrier demapping and the equalization 217, converts the frequency-domain signal into the time domain signal through M-point Inverse DFT (IDFT) 219, and detects and restores the transmit symbol 221.

As discussed above, the conventional OFDM or SC-FDMA transmitter performs the IFFT in a size corresponding to an entire system band. In more detail, the conventional transmitter carries out the IFFT in the size corresponding to the whole system band, regardless of the information to be transmitted. Even when the size of the information to be transmitted is small, the IFFT is performed based on the size corresponding to the entire system band. As a result, many computations are performed, thereby resulting in unnecessary power consumption. The unnecessary power consumption shortens the amount of time a terminal is able to communicate.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for an Inverse Fast Fourier Transform (IFFT) in a communication system.

Another aspect of the present invention is to provide a method and an apparatus for reducing computations and power consumption in an IFFT at a transmitter of a communication system.

Yet another aspect of the present invention is to provide a method and an apparatus for adaptively altering an IFFT size according to a size of information to transmit at a transmitter of a communication system.

The above aspects are addressed by providing a method for an IFFT in a communication system. The method includes determining an IFFT size based on a number of input information symbols, and performing an IFFT operation based on the determined IFFT size.

In accordance with an aspect of the present invention, an apparatus for an IFFT in a communication system is provided. The apparatus includes an IFFT part for determining an IFFT size based on a number of input information symbols and performing an IFFT operation based on the determined IFFT size, an interpolation filter for interpolation-filtering a time-domain signal to which the IFFT operation has been performed, and a modulator for modulating the interpolated signal.

In accordance with another aspect of the present invention, a method for an FFT in a communication system is provided. The method includes determining an FFT size based on a number of input information symbols, and performing an FFT operation based on the determined FFT size.

In accordance with yet another aspect of the present invention, an apparatus for an FFT in a communication system is provided. The apparatus includes an FFT part for determining an FFT size based on a number of input information symbols and performing an FFT operation in the determined FFT size.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus for adaptively changing an Inverse Fast Fourier Transform (IFFT) size according to a size of information to transmit at a transmitter of a communication system. Hereinafter, a Single Carrier Frequency Division Multiple Access (SC-FDMA) scheme is illustrated by way of example. However, the present invention may be applicable to any communication system which generates a transmit signal through the IFFT, such as in an Orthogonal Frequency Division Multiplexing (OFDM) scheme.

Figure 3:
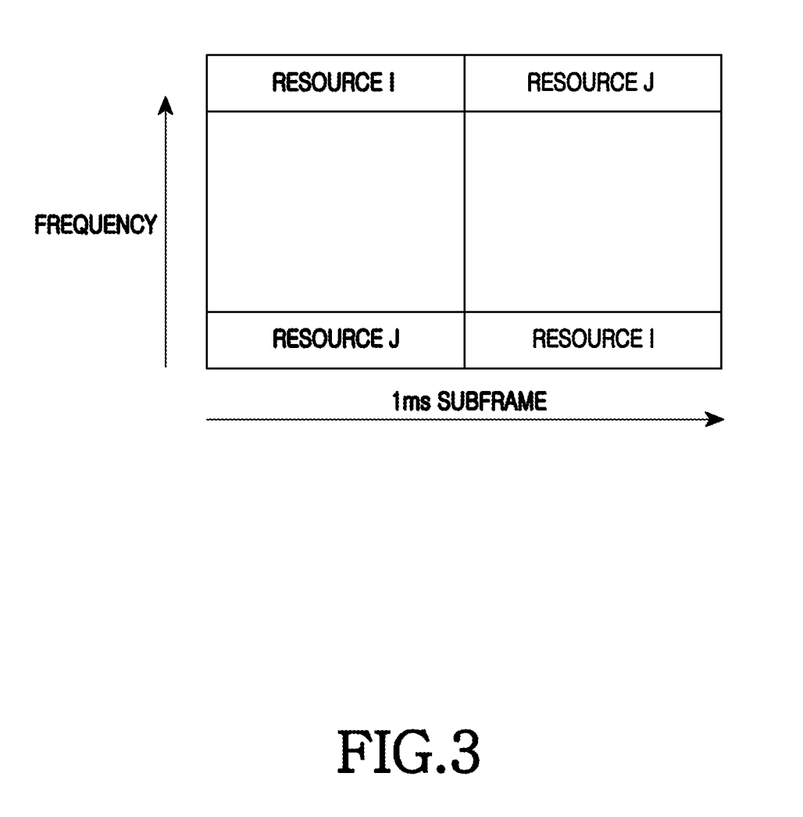
FIG. 3 is a diagram of a location and a size of a physical uplink control channel in bands of a system according to an LTE standard.

A size M (or a number of information symbols) of information symbols to be transmitted by a transmitter of the SC-FDMA communication system is smaller than a size N of the IFFT corresponding to a system band. As illustrated in FIG. 3, when there is only a control channel(Resource i, Resource j) in the entire band or when voice information is transmitted, such as by the Voice over Internet Protocol (VoIP), the information symbol size (or the number of information symbols) M can be smaller than N, which corresponds to the magnitude of the entire band. Herein, FIG. 3 depicts a location and a size of the control channel(Resource I, Resource j) in comparison with the whole bandwidth as defined in the Long Term Evolution (LTE) standard. For example, given only the control channel in the LTE system having a bandwidth of 20 MHz, the IFFT size N may be 2048 and the information symbol size M may be 12. In this situation, when the IFFT is executed as in the conventional method, the computations of the IFFT, which are about $N \times \log_2 N$, may produce a size of $2048 \times \log_2 2048$. If the size of the IFFT can be reduced by $\frac{1}{100}$, the computations of the IFFT can be reduced by about 664 ($100 \times \log_2 100$) times. Exemplary embodiments of the present invention provide the method and the apparatus for reducing the computations of the IFFT by decreasing the size of the IFFT based on the size of the information symbols to be transmitted by the transmitter.

Figure 4:
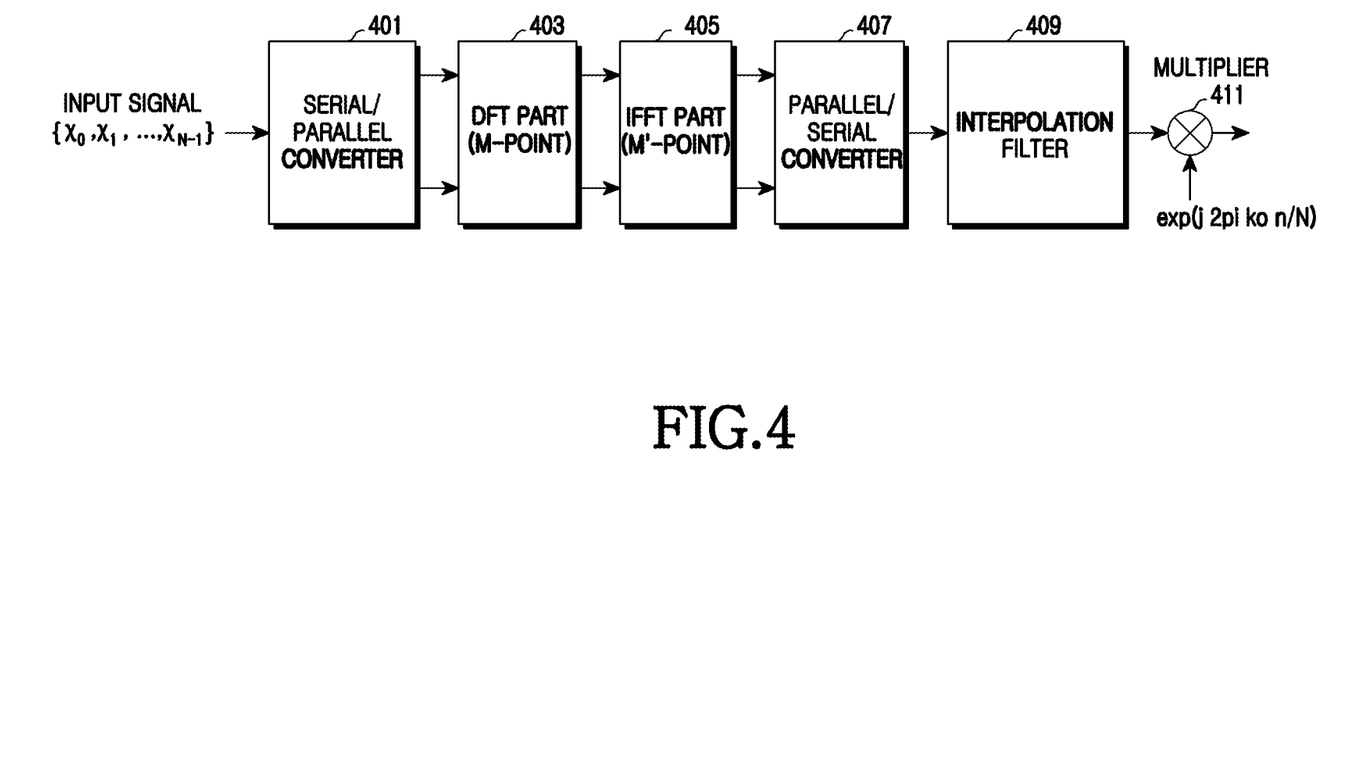
FIG. 4 is a block diagram of a transmitter in a communication system according to an exemplary embodiment of the present invention.

FIG. 4 is a block diagram of a transmitter in a communication system according to an exemplary embodiment of the present invention.

Referring to FIG. 4, the transmitter includes a serial/parallel converter 401, a Discrete Fourier Transform (DFT) part 403, an Inverse Fast Fourier Transform (IFFT) part 405, a parallel/serial converter 407, an interpolation filter 409, and a multiplier 411.

The serial/parallel converter 401 may convert a serial signal into a parallel signal and may output the parallel signal to the DFT part 403. The DFT part 403 may convert the time-domain parallel signal output from the serial/parallel converter 401 into a frequency-domain signal through the DFT operation. The DFT part 403 may apply the DFT operation, that is, the M-point DFT operation in relation to the size M corresponding to the information symbols to be transmitted.

The IFFT part 405 may convert the frequency-domain signal output from the DFT part 403 into the time-domain signal through an M'-point IFFT operation. The IFFT part 405 may conduct the IFFT operation by adaptively modifying the IFFT execution size, that is, M' according to the size of the input frequency-domain signal. More specifically, the IFFT part 405 may perform the IFFT in the size corresponding to the smallest one (M') of exponents of 2 greater than the size M of the information symbols to be transmitted. For example, when the size M of the DFT is 12, the size of the IFFT may correspond to 16, which is the smallest one of the exponents of 2 greater than 12.

Figure 6:
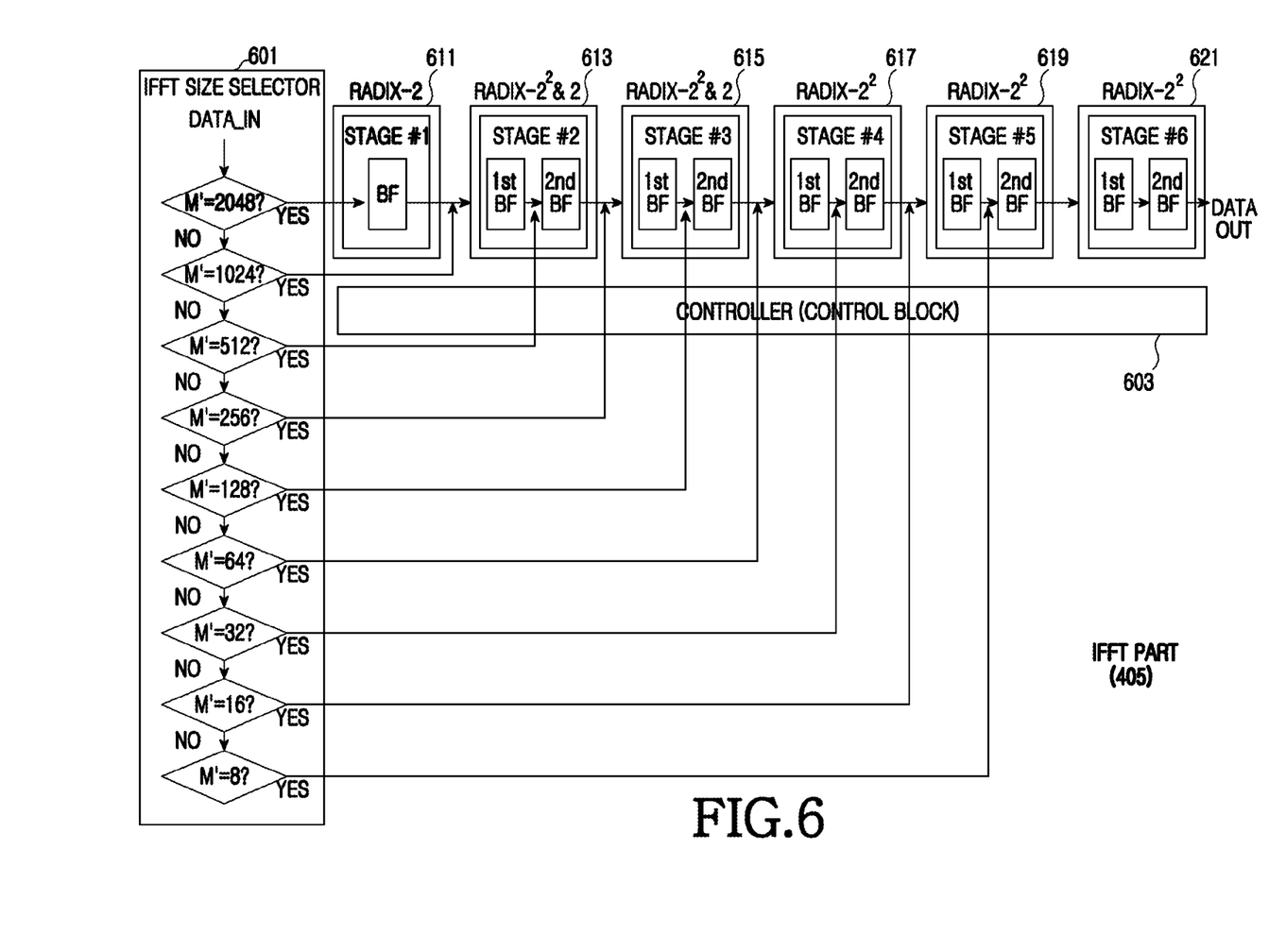
FIG. 6 is a detailed block diagram of an IFFT part of a transmitter in a communication system according to an exemplary embodiment of the present invention.

The structure of the IFFT part 405 is described below in more detail. The IFFT part can be implemented in a pipeline manner as illustrated in FIG. 6. FIG. 6 is a detailed block diagram of an IFFT part of a transmitter in a communication system according to an exemplary embodiment of the present invention. The IFFT part 405 of FIG. 6 includes an FFT size selector 601, a controller 603, and six stages 611, 613, 615, 617, 619 and 621 that may each include at least one ButterFly (BF).

The FFT size selector 601 may determine the IFFT size based on the magnitude of the input information symbols and may provide the input information symbols to the BFs of the corresponding stages under the control of the controller 603. For example, when the size M of the input information symbol is 12, the FFT size selector 601 may determine the IFFT size M' to be 16 and may output the IFFT size and the input information symbol. Based on an M' of 16, the controller 603 may forward the information symbol to the input of the fifth stage 619 such that four BF operations may be applied to the information symbol.

The BF of each stage 611 through 621 may process the input data based on a corresponding radix-r algorithm and may output the results of the operation.

As constructed above, upon determining the IFFT size based on the magnitude of the information symbols to be transmitted, the IFFT part 405 may perform as many BF operations that correspond to the determined size. For example, when the IFFT size is determined to be 32, the IFFT part 405 may perform the BF operation five times. When the IFFT size is determined to be 512, the IFFT part 405 may perform the BF operation nine times.

The parallel/serial converter 407 may convert the parallel input signal into the serial signal and may output the serial signal to the interpolation filter 409. The interpolation filter 409 may interpolate the signal output from the parallel/serial converter 407 through the interpolation filtering and may provide the interpolated signal to the multiplier 411.

Figure 5:
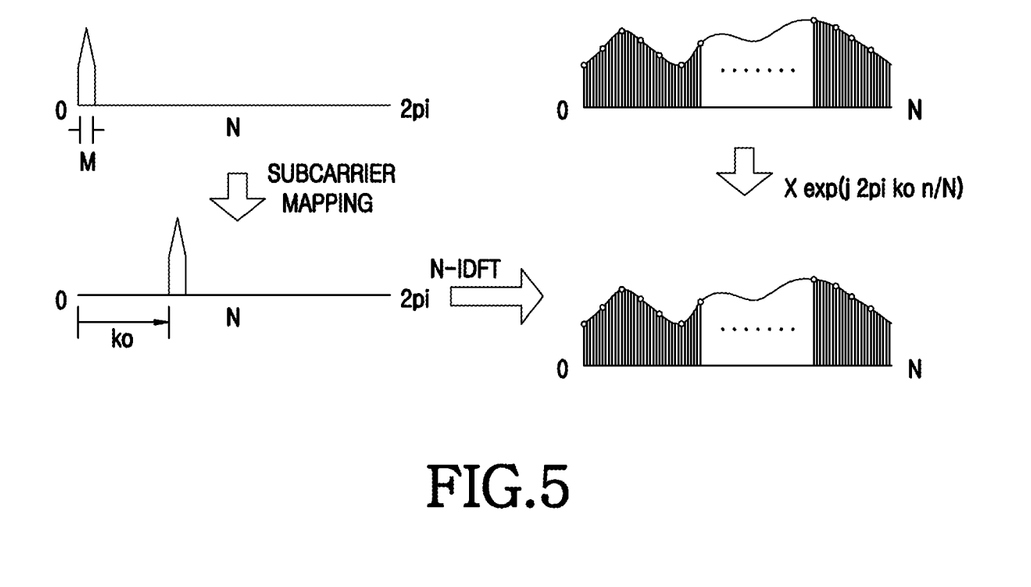
FIG. 5 is a diagram of relations between a frequency-domain subcarrier mapping and a time-domain modulation.

The multiplier 411 may modulate the signal by multiplying the time-domain signal output from the interpolation filter 409 by $\exp(j2\pi k_0 n/N)$. Herein, the modulation in the time domain may acquire the same result as a shift operation of subcarrier mapping in the frequency domain, as illustrated in FIG. 5. FIG. 5 is a diagram of relations between a frequency-domain subcarrier mapping and a time-domain modulation. By multiplying the time-domain signal of the M'-point IFFT operation by $\exp(j2\pi k_0 n/N)$, the same effect as in the conventional SC-FDMA transmitter can be attained.

While the conventional SC-FDMA transmitter having a bandwidth of 20 MHz performs the 2048-point IFFT after the subcarrier mapping, the transmitter of an exemplary embodiment of the present invention may carry out the interpolation and the modulation in the time domain after the 16-point IFFT, to thereby acquire the same effect as in the conventional transmitter while performing fewer computations.

Figure 7:
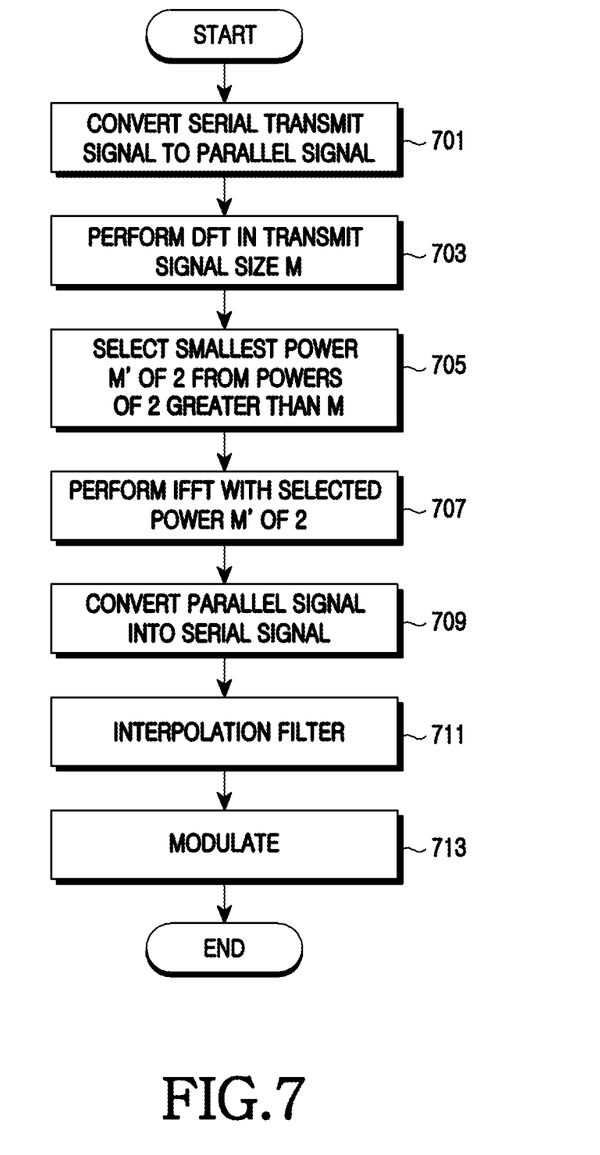
FIG. 7 is a flowchart of operations of a transmitter for sending a signal through an IFFT in a communication system according to an exemplary embodiment of the present invention.

FIG. 7 is a flowchart of operations of a transmitter for sending a signal through an IFFT in a communication system according to an exemplary embodiment of the present invention.

Referring to FIG. 7, in step 703, the transmitter may convert the serial transmit signal into the parallel signal in step 701, and may convert the parallel time-domain signal into the frequency-domain signal through the DFT in the size M of the information symbol to be transmitted.

In step 705, the transmitter may select the smallest one of the exponents of 2 greater than the size M of the transmit information symbol. In step 707, the transmitter may apply the IFFT of the size M' corresponding to the selected exponent of 2 to the frequency-domain signal. For example, when the size M of the input information symbol is 12, the transmitter may select 16 from the exponents of 2 greater than 12 as the IFFT size M' and may convert the input information symbol into the frequency-domain signal by conducting the BF operation for four times in the IFFT operation.

Next, the transmitter may convert the parallel time-domain signal into the serial signal in step 709, may perform the interpolation filtering in step 711, may modulate the signal in step 713 to allocate the consecutive subcarriers to the intended positions in the frequency band, and may then finish the process.

It should be appreciated that the operation by changing the IFFT size based on the size of the information symbol is applicable to the FFT, which is substantially opposite to the IFFT. That is, the FFT process can be carried out by changing the FFT size based on the size of the input information symbol.

As set forth above, the transmitter of the communication system performs the IFFT by adaptively changing the IFFT size based on the size of the information to transmit and allocates the transmit signal to the intended frequency band through the modulation, to thus reduce the implementation complexity and the necessary computations. Given the small amount of information to transmit as in the uplink control channel of the LTE system or the voice call, a considerable reduction of power consumption can be obtained. The present invention is applicable to communication systems adopting not only the OFDMA and the SC-FDMA but also the IFFT and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an Inverse Fast Fourier Transform (IFFT) in a communication system, the method comprising:
   determining an IFFT size based on a number of input information symbols, the IFFT size being the smallest power of two (2) that is greater than or equal to the number of input information symbols; and
   performing an IFFT operation based on the determined IFFT size,
   wherein the performing of the IFFT operation based on the determined IFFT size comprises:
      determining a number of butterfly corresponding to the determined IFFT size, and
      performing a butterfly operation based on the number of butterfly,
      wherein the butterfly operation includes processing the information symbols based on corresponding at least one of radix-$2^2$ and radix-2 patterns.

2. The method of claim 1, wherein the determining of the IFFT size based on the number of input information symbols comprises adaptively modifying the IFFT size based on the number of input information symbols.

3. The method of claim 1, wherein the communication system supports at least one of an Orthogonal Frequency Division Multiplexing (OFDM) and a Single Carrier Frequency Division Multiple Access (SC-FDMA).

4. The method of claim 1, further comprising:
   performing an interpolation filtering on a time-domain signal to which the IFFT operation has been performed; and
   modulating the interpolated signal.

5. An apparatus for an Inverse Fast Fourier Transform (IFFT) in a communication system, the apparatus comprising:
   an IFFT part for determining an IFFT size based on a number of input information symbols and for performing an IFFT operation based on the determined IFFT size;

an interpolation filter for interpolation-filtering a time-domain signal to which the IFFT operation has been performed; and a modulator for modulating the interpolated signal, wherein the IFFT part determines the IFFT size as the smallest power of two (2) that is greater than or equal to the number of input information symbols, and wherein the IFFT part comprises:
- a controller for determining a number of butterfly corresponding to the determined IFFT size, and for providing the information symbols to corresponding butterflies to perform a butterfly operation based on the number of butterfly, and
- a plurality of butterflies for processing the information symbols based on corresponding at least one of radix-$2^2$ and radix-2 patterns.

6. The apparatus of claim 5, wherein the IFFT part, when determining the IFFT size based on the number of input information symbols, adaptively modifies the IFFT size based on the number of input information symbols.

7. The apparatus of claim 5, wherein the communication system supports at least one of an Orthogonal Frequency Division Multiplexing (OFDM) and a Single Carrier Frequency Division Multiple Access (SC-FDMA).

8. A method for a Fast Fourier Transform (FFT) in a communication system, the method comprising:
- determining an FFT size based on a number of input information symbols, the FFT size being the smallest power of two (2) that is greater than or equal to the number of input information symbols; and
- performing an FFT operation based on the determined FFT size,
- wherein the performing of the FFT operation based on the determined FFT size comprises:
  - determining a number of butterfly equal to the determined FFT size,
  - performing a butterfly operation based on the number of butterfly,
  - wherein the butterfly operation includes processing the information symbols based on corresponding radix-$2^2$ and radix-2 patterns.

9. The method of claim 8, wherein the determining of the FFT size based on the number of input information symbols comprises adaptively modifying the FFT size based on the number of input information symbols.

10. An apparatus for a Fast Fourier Transform (FFT) in a communication system, the apparatus comprising:
- an FFT part for determining an FFT size based on a number of input information symbols and for performing an FFT operation based on the determined size,
- wherein the FFT part determines the FFT size as the smallest power of two (2) that is greater than or equal to the number of input information symbols,
- wherein the FFT part comprises:
  - a controller for determining a number of butterfly corresponding to the determined FFT size, and for providing the information symbols to corresponding butterflies to perform a butterfly operation based on the number of butterfly, and
  - a plurality of butterflies for processing the information symbols based on corresponding at least one of radix-$2^2$ and radix-2 algorithms.

11. The apparatus of claim 10, wherein the FFT part, when determining the FFT size based on the number of input information symbols, adaptively modifies the FFT size based on the number of input information symbols.

* * * * *